United States Patent
Asher et al.

(10) Patent No.: US 9,141,548 B2
(45) Date of Patent: Sep. 22, 2015

(54) METHOD AND APPARATUS FOR MANAGING WRITE BACK CACHE

(71) Applicant: Cavium, Inc., San Jose, CA (US)

(72) Inventors: David H. Asher, Sutton, MA (US); Gregg A. Bouchard, Georgetown, TX (US); Richard E. Kessler, Northborough, MA (US); Robert A. Sanzone, Hudson, MA (US)

(73) Assignee: Cavium, Inc., San Jose, CA (US)

( * ) Notice: Subject to any disclaimer, the term of this patent is extended or adjusted under 35 U.S.C. 154(b) by 0 days.

(21) Appl. No.: 14/159,210

(22) Filed: Jan. 20, 2014

(65) Prior Publication Data

US 2014/0317353 A1    Oct. 23, 2014

Related U.S. Application Data

(63) Continuation of application No. 11/030,010, filed on Jan. 5, 2005, now abandoned.

(60) Provisional application No. 60/609,211, filed on Sep. 10, 2004.

(51) Int. Cl.
*G06F 12/08* (2006.01)
*G06F 9/30* (2006.01)
(Continued)

(52) U.S. Cl.
CPC .......... *G06F 12/084* (2013.01); *G06F 9/30014* (2013.01); *G06F 9/30138* (2013.01);
(Continued)

(58) Field of Classification Search
CPC ............... G06F 12/084; G06F 12/0815; G06F 12/0813; G06F 12/0835; G06F 9/30014; G06F 12/0875; G06F 13/24; G06F 11/3632; G06F 9/30138; G06F 12/0891; G06F 9/383; G06F 2212/6012; G06F 12/0804; G06F 12/08
USPC ........................................................ 711/141
See application file for complete search history.

(56) References Cited

U.S. PATENT DOCUMENTS

| 4,415,970 A | 11/1983 | Swenson et al. |
| 4,755,930 A | 7/1988 | Wilson, Jr. et al. |

(Continued)

FOREIGN PATENT DOCUMENTS

| GB | 2378779 A | 2/2003 |
| WO | WO 2006/031462 | 3/2006 |
| WO | WO 2006/031551 | 3/2006 |

OTHER PUBLICATIONS

Gharachorloo, Kourosh, et al., "Architecture and Design of AlphaServer GS320." *Ninth International Conference on Architectural Support for Programming Languages and Operating Systems (ASPLOS-IX)* (2000).

(Continued)

*Primary Examiner* — Edward Dudek, Jr.
*Assistant Examiner* — Christopher D Birkhimer
(74) *Attorney, Agent, or Firm* — Hamilton, Brook, Smith & Reynolds, P.C.

(57) ABSTRACT

A network services processor includes an input/output bridge that avoids unnecessary updates to memory when cache blocks storing processed packet data are no longer required. The input/output bridge monitors requests to free buffers in memory received from cores and IO units in the network services processor. Instead of writing the cache block back to the buffer in memory that will be freed, the input/output bridge issues don't write back commands to a cache controller to clear the dirty bit for the selected cache block, thus avoiding wasteful write-backs from cache to memory. After the dirty bit is cleared, the buffer in memory is freed, that is, made available for allocation to store data for another packet.

12 Claims, 6 Drawing Sheets

(51) Int. Cl.
*G06F 9/38* (2006.01)
*G06F 11/36* (2006.01)
*G06F 13/24* (2006.01)

(52) U.S. Cl.
CPC ............ *G06F9/383* (2013.01); *G06F 11/3632* (2013.01); *G06F 12/0813* (2013.01); *G06F 12/0815* (2013.01); *G06F 12/0835* (2013.01); *G06F 12/0875* (2013.01); *G06F 12/0891* (2013.01); *G06F 13/24* (2013.01); *G06F 12/0804* (2013.01); *G06F 2212/6012* (2013.01)

(56) References Cited

U.S. PATENT DOCUMENTS

| | | | |
|---|---|---|---|
| 4,780,815 A | 10/1988 | Shiota | |
| 5,091,846 A | 2/1992 | Sachs et al. | |
| 5,119,485 A | 6/1992 | Ledbetter et al. | |
| 5,155,831 A | 10/1992 | Emma et al. | |
| 5,276,852 A | 1/1994 | Callander et al. | |
| 5,347,648 A * | 9/1994 | Stamm et al. | 714/5.11 |
| 5,404,482 A * | 4/1995 | Stamm et al. | 711/145 |
| 5,404,483 A * | 4/1995 | Stamm et al. | 711/144 |
| 5,408,644 A | 4/1995 | Schneider et al. | |
| 5,432,918 A * | 7/1995 | Stamm | 711/156 |
| 5,590,368 A | 12/1996 | Heeb et al. | |
| 5,619,680 A | 4/1997 | Berkovich et al. | |
| 5,623,627 A | 4/1997 | Witt | |
| 5,623,633 A | 4/1997 | Zeller et al. | |
| 5,737,547 A | 4/1998 | Zuravleff et al. | |
| 5,737,750 A | 4/1998 | Kumar et al. | |
| 5,742,840 A | 4/1998 | Hansen et al. | |
| 5,754,819 A | 5/1998 | Lynch et al. | |
| 5,794,060 A | 8/1998 | Hansen et al. | |
| 5,794,061 A | 8/1998 | Hansen et al. | |
| 5,809,321 A | 9/1998 | Hansen et al. | |
| 5,822,603 A | 10/1998 | Hansen et al. | |
| 5,860,158 A | 1/1999 | Pai et al. | |
| 5,890,217 A | 3/1999 | Kabemoto et al. | |
| 5,893,141 A | 4/1999 | Kulkarni | |
| 5,895,485 A | 4/1999 | Loechel et al. | |
| 5,897,656 A | 4/1999 | Vogt et al. | |
| 5,991,855 A | 11/1999 | Jeddeloh et al. | |
| 6,009,263 A | 12/1999 | Golliver et al. | |
| 6,018,792 A | 1/2000 | Jeddeloh et al. | |
| 6,021,473 A | 2/2000 | Davis et al. | |
| 6,026,475 A | 2/2000 | Woodman | |
| 6,065,092 A | 5/2000 | Roy | |
| 6,070,227 A | 5/2000 | Rokicki | |
| 6,125,421 A | 9/2000 | Roy | |
| 6,134,634 A | 10/2000 | Marshall, Jr. et al. | |
| 6,188,624 B1 | 2/2001 | Zheng | |
| 6,226,715 B1 | 5/2001 | Van Der Wolf et al. | |
| 6,279,080 B1 | 8/2001 | DeRoo | |
| 6,408,365 B1 | 6/2002 | Hosomi | |
| 6,438,658 B1 | 8/2002 | Baliga et al. | |
| 6,526,481 B1 | 2/2003 | Shen et al. | |
| 6,546,471 B1 | 4/2003 | Tarui et al. | |
| 6,560,680 B2 | 5/2003 | Meyer | |
| 6,563,818 B1 | 5/2003 | Sang et al. | |
| 6,571,320 B1 | 5/2003 | Hachmann | |
| 6,587,920 B2 | 7/2003 | Mekhiel | |
| 6,598,136 B1 | 7/2003 | Norrod et al. | |
| 6,622,214 B1 | 9/2003 | Vogt et al. | |
| 6,622,219 B2 | 9/2003 | Tremblay et al. | |
| 6,643,745 B1 | 11/2003 | Palanca et al. | |
| 6,647,456 B1 | 11/2003 | Van Dyke et al. | |
| 6,654,858 B1 | 11/2003 | Asher et al. | |
| 6,665,768 B1 | 12/2003 | Redford | |
| 6,718,457 B2 | 4/2004 | Tremblay et al. | |
| 6,725,336 B2 | 4/2004 | Cherabuddi | |
| 6,754,810 B2 | 6/2004 | Elliott et al. | |
| 6,757,784 B2 | 6/2004 | Lu et al. | |
| 6,785,677 B1 | 8/2004 | Fritchman | |
| 6,924,810 B1 | 8/2005 | Tischler | |
| 7,055,003 B2 | 5/2006 | Cargnoni et al. | |
| 7,093,153 B1 | 8/2006 | Witek et al. | |
| 7,209,996 B2 | 4/2007 | Kohn et al. | |
| 7,558,925 B2 | 7/2009 | Bouchard et al. | |
| 7,594,081 B2 | 9/2009 | Bouchard et al. | |
| 2001/0037406 A1 | 11/2001 | Philbrick et al. | |
| 2001/0054137 A1 | 12/2001 | Eickemeyer et al. | |
| 2002/0032827 A1 | 3/2002 | Nguyen et al. | |
| 2002/0099909 A1 | 7/2002 | Meyer | |
| 2002/0112129 A1 | 8/2002 | Arimilli et al. | |
| 2003/0056061 A1 | 3/2003 | Sherman | |
| 2003/0065884 A1 | 4/2003 | Lu et al. | |
| 2003/0067913 A1 | 4/2003 | Georgiou et al. | |
| 2003/0105793 A1 | 6/2003 | Guttag et al. | |
| 2003/0110208 A1 | 6/2003 | Wyschogrod et al. | |
| 2003/0115238 A1 | 6/2003 | O'Connor et al. | |
| 2003/0115403 A1 | 6/2003 | Bouchard et al. | |
| 2003/0172232 A1 | 9/2003 | Naffziger | |
| 2003/0212874 A1 | 11/2003 | Alderson | |
| 2004/0010782 A1 | 1/2004 | Moritz | |
| 2004/0012607 A1 | 1/2004 | Witt | |
| 2004/0059880 A1 | 3/2004 | Bennett | |
| 2004/0073778 A1 | 4/2004 | Adiletta et al. | |
| 2004/0250045 A1 | 12/2004 | Dowling | |
| 2005/0114606 A1 | 5/2005 | Matick et al. | |
| 2005/0138276 A1 | 6/2005 | Navada et al. | |
| 2005/0138297 A1 | 6/2005 | Sodani et al. | |
| 2005/0166038 A1 | 7/2005 | Wang et al. | |
| 2005/0267996 A1 | 12/2005 | O'Connor et al. | |
| 2005/0273563 A1 * | 12/2005 | Kim et al. | 711/143 |
| 2005/0273605 A1 | 12/2005 | Saha et al. | |
| 2006/0059310 A1 | 3/2006 | Asher et al. | |
| 2006/0059314 A1 | 3/2006 | Bouchard et al. | |
| 2006/0059316 A1 | 3/2006 | Asher et al. | |
| 2006/0143396 A1 | 6/2006 | Cabot | |
| 2007/0038798 A1 | 2/2007 | Bouchard et al. | |
| 2010/0306510 A1 | 12/2010 | Olson et al. | |

OTHER PUBLICATIONS

Jouppi, Norman P., "Cache Write Policies and Performance," *WRL Research Report 91/12* (1991).

Handy, Jim. "The Cache memory Book." 1998. Academic Press, Inc. Second edition. pp. 85-86.

Handy, Jim. "The Cache memory Book." 1998. Academic Press, Inc. Second edition. pp. 126-127.

"Microsoft Computer Dictionary," 2002. Microsoft Press, Fifth Edition, p. 466.

"Double Date Rate SDRAMs operate at 4000MHz", Oct. 14, 2003.

Stokes, Jon, "A Look at Centrino's Core: The Pentium M" "Instruction decoding and micro-op fusion," http://arstechnica.com/articles/paedia/cpu/pentium-m.ars/4, pp. 1-4, Feb. 25, 2004.

Van Riel, R, "Page Replacement in Linux 2.4 Memory Management", Collective Inc., pp. 1-10. Retrieved from the internet on Jun. 5, 2007; URL: http://web.archive.org/web/2001821013232/http://surriel.com/lectures.linux24-vm.html.

* cited by examiner

METHOD AND APPARATUS FOR MANAGING WRITE BACK CACHE

RELATED APPLICATIONS

This application is a continuation of Ser. No. 11/030,010, filed Jan. 5, 2005, which claims the benefit of U.S. Provisional Application No. 60/609,211, filed on Sep. 10, 2004. The entire teachings of the above applications are incorporated herein by reference.

BACKGROUND OF THE INVENTION

A multi-processing system includes a plurality of processors that share a single memory. Typically, multi-level caches are used to reduce memory bandwidth demands on the single memory. The multi-level caches may include a first-level private cache in each processor and a second-level cache shared by all of the processors. As the cache is much smaller than the memory in the system, only a portion of the data stored in buffers/blocks in memory is replicated in the cache.

If data stored in a buffer/block requested by a processor is replicated in the cache, there is a cache hit. If the requested data is not replicated in the cache, there is a cache miss and the requested block that stores the data is retrieved from memory and also stored in the cache.

When shared data is cached, the shared value may be replicated in multiple first-level caches. Thus, caching of shared data requires cache coherence. Cache coherence ensures that multiple processors see a consistent view of memory, for example, a read of the shared data by any of the processors returns the most recently written value of the data.

Typically, blocks of memory (cache blocks) are replicated in cache and each cache block has an associated tag that includes a so-called dirty bit. The state of the dirty bit indicates whether the cache block has been modified. In a write back cache, the modified cache block is written back to memory only when the modified cache block is replaced by another cache block in the cache.

SUMMARY OF THE INVENTION

In a network services processor, when the modified cache block is replaced in the cache, the modified cache block may not always need to be written back to memory. For example, the cache block can be used to store packet data while it is being processed. After the data has been processed, the processed packet data stored in the cache block is no longer required and the buffer in memory is freed, that is, made available for allocation to store data for another packet. As the processed packet data that is stored in the cache block will not be used when the buffer in memory is re-allocated for storing other packet data, it would be wasteful to write the cache block in the cache back to the buffer in memory. Not performing a write operation to write the cache block back to memory reduces both the time taken for the write operation in the processor and the memory bandwidth to write the data to memory.

Accordingly, a network services processor includes a input/output bridge that avoids unnecessary memory updates when cache blocks storing processed packet data are no longer required, that is, buffers in memory (corresponding to the cache blocks in cache) are freed. Instead of writing the cache block back to memory, only the dirty bit for the selected cache block is cleared, thus avoiding these wasteful writebacks from cache to memory.

A network services processor includes a plurality of processors and a coherent shared memory. The coherent memory includes a cache and a memory and is shared by the plurality of processors. An input/output bridge is coupled to the plurality of processors and the cache. The input/output bridge monitors requests to free a buffer in memory (that is, a buffer that has been allocated for storing packet data) to avoid writing a modified cache block in the cache back to the buffer.

Upon detecting a request to free the block stored in cache memory, the input/output bridge issues a command to clear a dirty bit associated with the cache block. A cache controller may be coupled to the plurality of processors, the cache and the input/output bridge. The cache controller stores the dirty bit associated with the block and clears the dirty bit upon receiving the command from the input/output bridge.

The input/output bridge may also include a don't write back queue which stores commands to be issued to the cache controller. The input/output bridge may include a free queue that stores requests to free blocks to be added to a free pool. The network services processor may also include a plurality of processing units coupled to the input/output bridge. The input/output bridge stores packets to be transferred between the processing units and the coherent shared memory in which packets are stored for processing by the processors.

The network services processor may also include a memory allocator that provides free lists of blocks in shared coherent memory for storing received packets.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
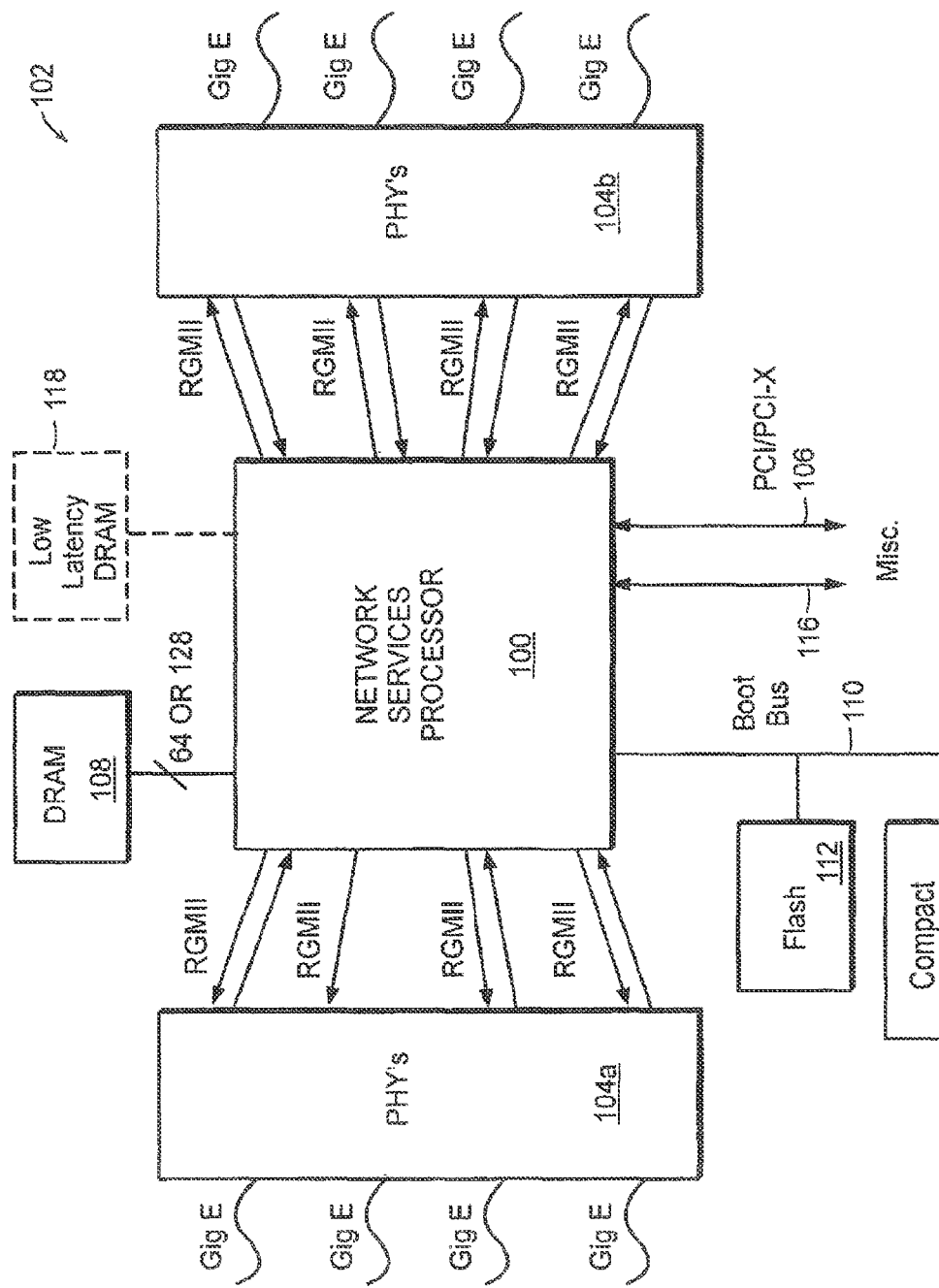
FIG. 1 is a block diagram of a security appliance including a network services processor according to the principles of the present invention.

FIG. 1 is a block diagram of a security appliance 102 including a network services processor 100 according to the principles of the present invention. The security appliance 102 is a standalone system that can switch packets received at one Ethernet port (Gig E) to another Ethernet port (Gig E) and perform a plurality of security functions on received packets prior to forwarding the packets. For example, the security appliance 102 can be used to perform security processing on packets received on a Wide Area Network prior to forwarding the processed packets to a Local Area Network. The network services processor 100 includes hardware packet processing, buffering, work scheduling, ordering, synchronization, and cache coherence support to accelerate packet processing tasks according to the principles of the present invention.

The network services processor 100 processes Open System Interconnection network L2-L7 layer protocols encapsulated in received packets. As is well-known to those skilled in the art, the Open System Interconnection (OSI) reference model defines seven network protocol layers (L1-7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor performs work (packet processing operations) for upper level network protocols, for example, L4-L7. The packet processing (work) to be performed on a particular packet includes a plurality of packet processing operations (pieces of work). The network services processor allows processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

The network services processor 100 includes a plurality of Ethernet Media Access Control interfaces with standard Reduced Gigabyte Media Independent Interface (RGMII) connections to the off-chip PHYs 104a, 104b.

The network services processor 100 receives packets from the Ethernet ports (Gig E) through the physical interfaces PHY 104a, 104b, performs L7-L2 network protocol processing on the received packets and forwards processed packets through the physical interfaces 104a, 104b to another hop in the network or the final destination or through the PCI bus 106 for further processing by a host processor. The network protocol processing can include processing of network security protocols such as Firewall, Application Firewall, Virtual Private Network (VPN) including IP Security (IPSec) and/or Secure Sockets Layer (SSL), Intrusion detection System (IDS) and Anti-virus (AV).

A DRAM controller in the network services processor 100 controls access to an external Dynamic Random Access Memory (DRAM) 108 that is coupled to the network services processor 100. The DRAM 108 stores data packets received from the PHYs interfaces 104a, 104b or the Peripheral Component Interconnect Extended (PCI-X) interface 106 for processing by the network services processor 100. In one embodiment, the DRAM interface supports 64 or 128 bit Double Data Rate II Synchronous Dynamic Random Access Memory (DDR II SDRAM) operating up to 800 MHz.

A boot bus 110 provides the necessary boot code which is stored in flash memory 112 and is executed by the network services processor 100 when the network services processor 100 is powered-on or reset. Application code can also be loaded into the network services processor 100 over the boot bus 110, from a device 114 implementing the Compact Flash standard, or from another high-volume device, which can be a disk, attached via the PCI bus.

The miscellaneous I/O interface 116 offers auxiliary interfaces such as General Purpose Input/Output (GPIO), Flash, IEEE 802 two-wire Management Interface (MDIO), Universal Asynchronous Receiver-Transmitters (UARTs) and serial interfaces.

The network services processor 100 includes another memory controller for controlling Low latency DRAM 118. The low latency DRAM 118 is used for Internet Services and Security applications allowing fast lookups, including the string-matching that may be required for Intrusion Detection System (IDS) or Anti Virus (AV) applications.

Figure 2:
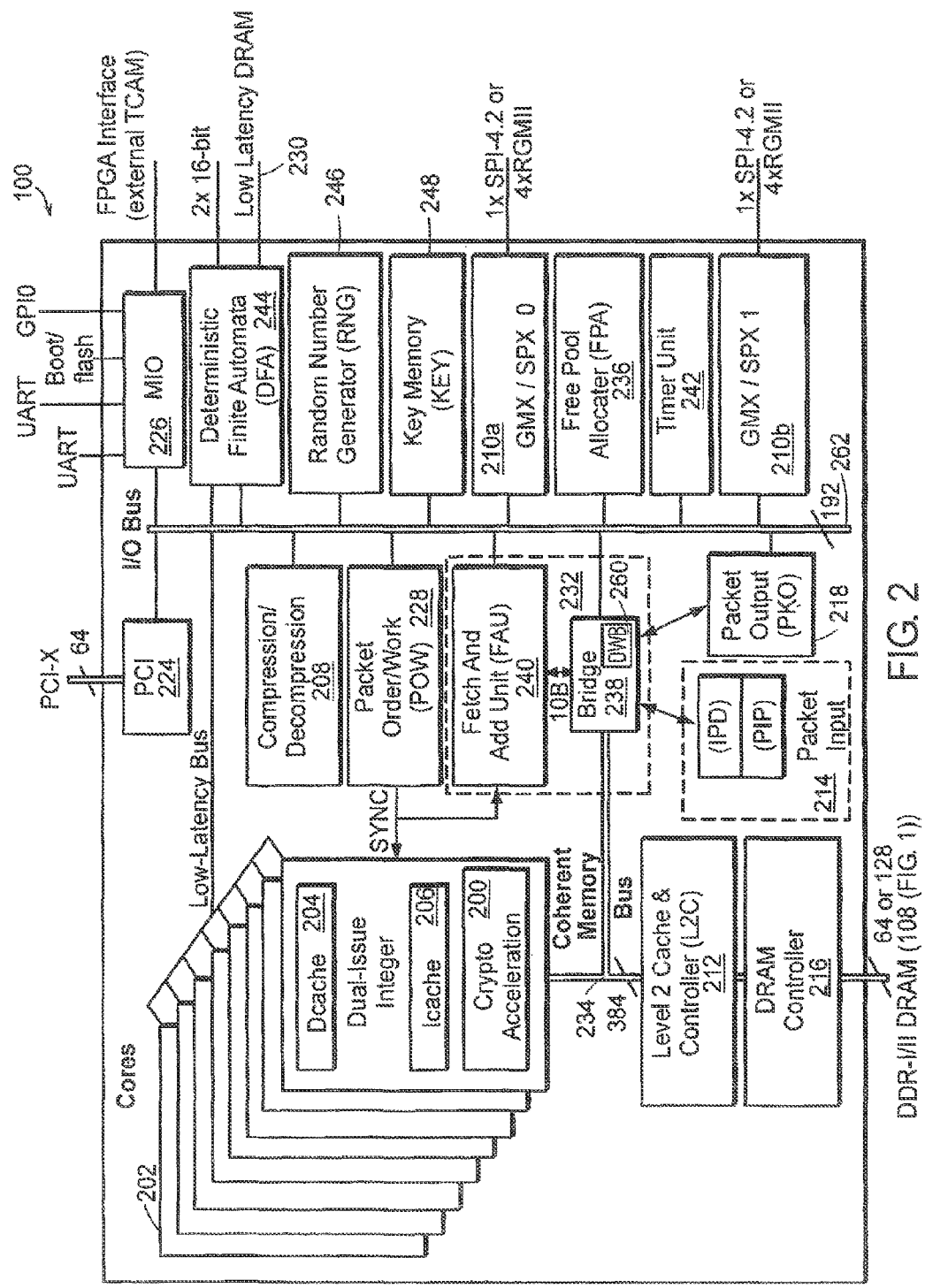
FIG. 2 is a block diagram of the network services processor shown in FIG. 1.

FIG. 2 is a block diagram of the network services processor 100 shown in FIG. 1. The network services processor 100 delivers high application performance using a plurality of processor cores 202.

In one embodiment, each processor core 202 is a dual-issue, superscalar processor with instruction cache 206, Level 1 data cache 204, and built-in hardware acceleration (crypto acceleration module) 200 for cryptography algorithms with direct access to low latency memory over the low latency memory bus 230.

The network services processor 100 includes a memory subsystem. The memory subsystem includes level 1 data cache memory 204 in each core 202, instruction cache in each core 202, level 2 cache memory 212, a DRAM controller 216 for access to external DRAM memory 108 (FIG. 1) and an interface 230 to external low latency memory.

The memory subsystem is architected for multi-core support and tuned to deliver both high-throughput and low-latency required by memory intensive content networking applications. Level 2 cache memory 212 and external DRAM memory 108 (FIG. 1) are shared by all of the cores 202 and I/O co-processor devices over a coherent memory bus 234. The coherent memory bus 234 is the communication channel for all memory and I/O transactions between the cores 202, an I/O Bridge (IOB) 232 and the Level 2 cache and controller 212.

Frequently used data values stored in DRAM 108 (FIG. 1) may be replicated for quick access in cache (L1 or L2). The cache stores the contents of frequently accessed locations in DRAM 108 (FIG. 1) and the address in DRAM where the contents are stored. If the cache stores the contents of an address in DRAM requested by a core 202, there is a "hit" and the data stored in the cache is returned. If not, there is a "miss" and the data is read directly from the address in DRAM 108 (FIG. 1).

A Free Pool Allocator (FPA) 236 maintains pools of pointers to free memory locations (that is, memory that is not currently used and is available for allocation) in DRAM 108 (FIG. 1). In one embodiment, the FPA unit 236 implements a bandwidth efficient (Last In First Out (LIFO)) stack for each pool of pointers.

In one embodiment, pointers submitted to the free pools are aligned on a 128 byte boundary and each pointer points to at least 128 bytes of free memory. The free size (number of bytes) of memory can differ in each pool and can also differ within the same pool. In one embodiment, the FPA unit 236 stores up to 2048 pointers. Each pool uses a programmable portion of these 2048 pointers, so higher priority pools can be allocated a larger amount of free memory. If a pool of pointers is too large to fit in the Free Pool Allocator (FPA) 236, the Free Pool Allocator (FPA) 236 builds a tree/list structure in level 2 cache 212 or DRAM using freed memory in the pool of pointers to store additional pointers.

The I/O Bridge (IOB) 232 manages the overall protocol and arbitration and provides coherent I/O partitioning. The IOB 232 includes a bridge 238 and a Fetch and Add Unit (FAU) 240. The bridge 238 includes queues for storing information to be transferred between the I/O bus 262, coherent memory bus 234, and the IO units including the packet input unit 214 and the packet output unit 218. The bridge 238 also includes a Don't Write Back (DWB) engine 260 that monitors requests to free memory in order to avoid unnecessary cache updates to DRAM 108 (FIG. 1) when cache blocks are no longer required (that is, the buffers in memory are freed) by adding them to a free pool in the FPA unit 236. Prior to describing the operation of the bridge 238 in further detail, the IO units coupled to the IO bus 262 in the network services processor 100 will be described.

Packet Input/Output processing is performed by an interface unit 210a, 210b, a packet input unit (Packet Input) 214 and a packet output unit (PKO) 218. The input controller and interface units 210a, 210b perform all parsing of received packets and checking of results to offload the cores 202.

The packet input unit 214 allocates and creates a work queue entry for each packet. This work queue entry includes a pointer to one or more buffers (blocks) stored in L2 cache 212 or DRAM 108 (FIG. 1). The packet input unit 214 writes packet data into buffers in Level 2 cache 212 or DRAM 108 in a format that is convenient to higher-layer software executed in at least one processor core 202 for further processing of higher level network protocols. The packet input unit 214 supports a programmable buffer size and can distribute packet data across multiple buffers in DRAM 108 (FIG. 1) to support large packet input sizes.

A packet is received by any one of the interface units 210a, 210b through a SPI-4.2 or RGM II interface. A packet can also be received by the PCI interface 224. The interface unit 210a, 210b handles L2 network protocol pre-processing of the received packet by checking various fields in the L2 network protocol header included in the received packet. After the interface unit 210a, 210b has performed L2 network protocol processing, the packet is forwarded to the packet input unit 214. The packet input unit 214 performs pre-processing of L3 and L4 network protocol headers included in the received packet. The pre-processing includes checksum checks for Transmission Control Protocol (TCP)/User Datagram Protocol (UDP) (L3 network protocols).

The Packet order/work (POW) module (unit) 228 queues and schedules work (packet processing operations) for the processor cores 202. Work is defined to be any task to be performed by a core that is identified by an entry on a work queue. The task can include packet processing operations, for example, packet processing operations for L4-L7 layers to be performed on a received packet identified by a work queue entry on a work queue. The POW module 228 selects (i.e. schedules) work for a core 202 and returns a pointer to the work queue entry that describes the work to the core 202.

After the packet has been processed by the cores 202, a packet output unit (PKO) 218 reads the packet data stored in L2 cache 212 or memory (DRAM 108 (FIG. 1)), performs L4 network protocol post-processing (e.g., generates a TCP/UDP checksum), forwards the packet through the interface unit 210a, 210b and frees the L2 cache 212 or DRAM 108 locations used to store the packet by adding pointers to the locations in a pool in the FPA unit 236.

The network services processor 100 also includes application specific co-processors that offload the cores 202 so that the network services processor achieves high-throughput. The application specific co-processors include a DFA co-processor 244 that performs Deterministic Finite Automata (DFA) and a compression/decompression co-processor 208 that performs compression and decompression.

The Fetch and Add Unit (FAU) 240 is a 2 KB register file supporting read, write, atomic fetch-and-add, and atomic update operations. The PCI interface controller 224 has a DMA engine that allows the processor cores 202 to move data asynchronously between local memory in the network services processor and remote (PCI) memory in both directions.

Figure 3:
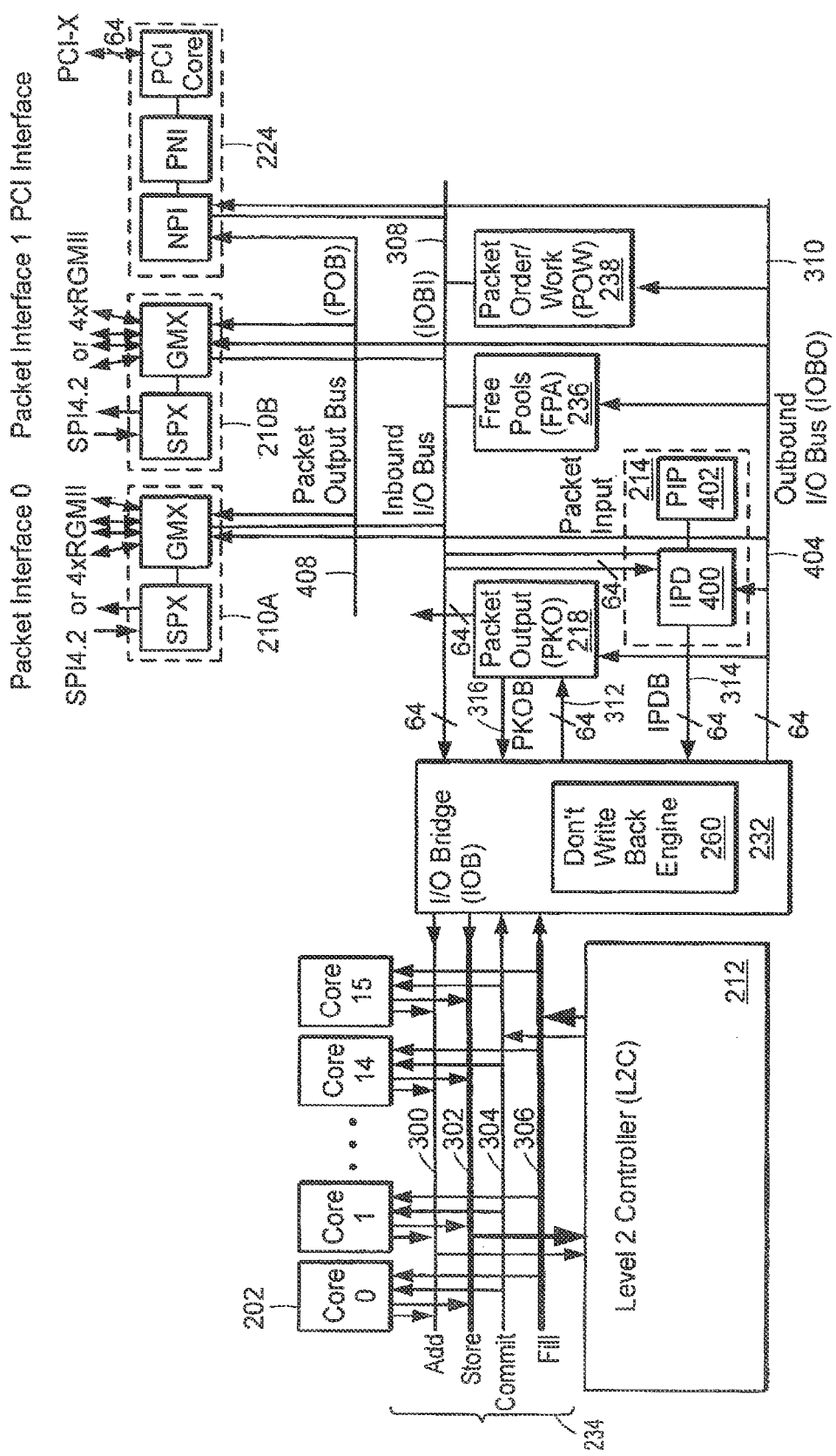
FIG. 3 is a block diagram illustrating a Coherent Memory Bus (CMB) coupled to cores, L2 cache controller and Input/Output Bridge (IOB) and units for performing input and output packet processing coupled to the IOB through the IO bus.

FIG. 3 is a block diagram illustrating the Coherent Memory Bus (CMB) 234 coupled to the cores 202, L2 cache controller 212 and Input/Output Bridge (IOB) 232. FIG. 3 also illustrates IO units for performing input and output packet processing coupled to the IOB 232 through the IO bus 262. The CMB 234 is the communication channel for all memory and I/O transactions between the cores 202, the IOB 232 and the L2 cache controller and cache 212.

The CMB 234 includes four busses: ADD 300, STORE 302, COMMIT 304, and FILL 306. The ADD bus 300 transfers address and control information to initiate a CMB transaction. The STORE bus 302 transfers the store data associated with a transaction. The COMMIT bus 304 transfers control information that initiates transaction responses from the L2 cache. The FILL bus 306 transfers fill data (cache blocks) from the L2 cache controller and cache 212 to the L1 data cache 204 and reflection data for transfers from a core 202 to the I/O bus 262. The reflection data includes commands/results that are transferred between the I/O Bridge 232 and cores 202. The CMB 234 is a split-transaction highly pipelined bus. For an embodiment with a cache block size of 128 bytes, a CMB transaction transfers a cache block size at a time.

All of the busses in the CMB 234 are decoupled by queues in the L2 cache controller and cache 212 and the bridge 238. This decoupling allows for variable timing between the different operations required to complete different CMB transactions.

Memory requests to coherent memory space initiated by a core 202 or the IOB 232 are directed to the L2 cache controller 212. The IOB 232 initiates memory requests on behalf of I/O units coupled to the IO bus 262.

A fill transaction initiated by a core 202 replicates contents of a cache block in either L1 instruction cache 206 (FIG. 1) or L1 data cache 204 (FIG. 1). Once the core wins arbitration for the ADD bus 300, it puts control information (that is, the fill transaction) and the address of the cache block on the ADD bus 300. The L2 cache controller 212 receives the ADD bus information, and services the transaction by sending a fill indication on the COMMIT bus 304 and then transferring the cache block on the FILL bus 306.

A store transaction puts contents of a cache block stored in L1 instruction cache 206 (FIG. 2) or L1 data cache 204 (FIG. 2) into L2 cache. Once the initiator (core or IOB) wins arbitration for the ADD bus, it puts control information (store transaction), the address of the cache block and the number of transfers required on the ADD bus. The STORE bus cycles are scheduled later, after the STORE bus 302 is available. The store data is driven onto the STORE bus 302 by the cores or IOB 232. For an embodiment with a cache block size of 128 bytes and 128-bit octaword (16 byte) transfers, the number of cycles on the STORE bus 302 can range from one to eight to transfer an entire cache block. If a copy of the cache block is not stored in L1 data cache 204 in another core, no core data cache invalidation is required and the L2 cache controller 212 puts a commit operation on the COMMIT bus 304. The commit operation indicates that the store is visible to all users of the CMB at this time. If an out-of-date copy of the cache block resides in at least one L1 data cache 204 in a core 202, a commit/invalidation operation appears on the COMMIT bus 304, followed by an invalidation cycle on the FILL bus 306.

A Don't write back command issued by the IOB 232 results in control information and the address of the cache block placed on the ADD bus 300. The L2 cache controller 212 receives the ADD bus information and services the command by clearing a dirty bit in a tag associated with the cache block, if the cache block is present in the L2 cache. The L2 cache controller and cache 212 will be described later in conjunction with FIG. 4. By clearing the dirty bit in the tag associated with the cache block, a write of the cache block back to DRAM 108 (FIG. 1) is avoided. In a write-back cache, this write is avoided whenever the cache block is replaced in the L2 cache.

As already discussed in conjunction with FIG. 1 and FIG. 2, packets are received through any one of the interface units 210a, 210b or the PCI interface 224. The interface units 210a, 210b and packet input unit 214 perform parsing of received packets and check the results of the parsing to offload the cores 202. The interface unit 210a, 210b checks the L2 network protocol trailer included in a received packet for common exceptions. If the interface unit 210a, 210b accepts the packet, the Free Pool Allocator (FPA) 236 allocates memory for storing the packet data in L2 cache memory or DRAM 108 (FIG. 1) and the packet is stored in the allocated memory (cache or DRAM).

The packet input unit 214 includes a Packet Input Processing (PIP) unit 302 and an Input Packet Data unit (IPD) 400. The packet input unit 214 uses one of the pools of pointers in the FPA unit 236 to store received packet data in level 2 cache or DRAM.

The I/O busses include an inbound bus (IOBI) 308 and an outbound bus (IOBO) 310, a packet output bus (POB) 312, a PKO-specific bus (PKOB) 316 and an input packet data bus (IPDB) 314. The interface unit 210a, 210b places the 64-bit packet segments from the received packets onto the IOBI bus 308. The IPD 400 in the packet input unit 214 latches each 64-bit packet segment from the IOBI bus for processing. The IPD 400 accumulates the 64 bit packet segments into 128-byte cache blocks. The IPD 400 then forwards the cache block writes on the IPDB bus 314. The I/O Bridge 232 forwards the cache block write onto the Coherent Memory Bus (CMB) 234.

A work queue entry is added to a work queue by the packet input unit 214 for each packet arrival. The work queue entry is the primary descriptor that describes work to be performed by the cores. The Packet Order/Work (POW) unit 228 implements hardware work queuing, hardware work scheduling and tag-based synchronization and ordering to queue and schedule work for the cores.

Figure 4:
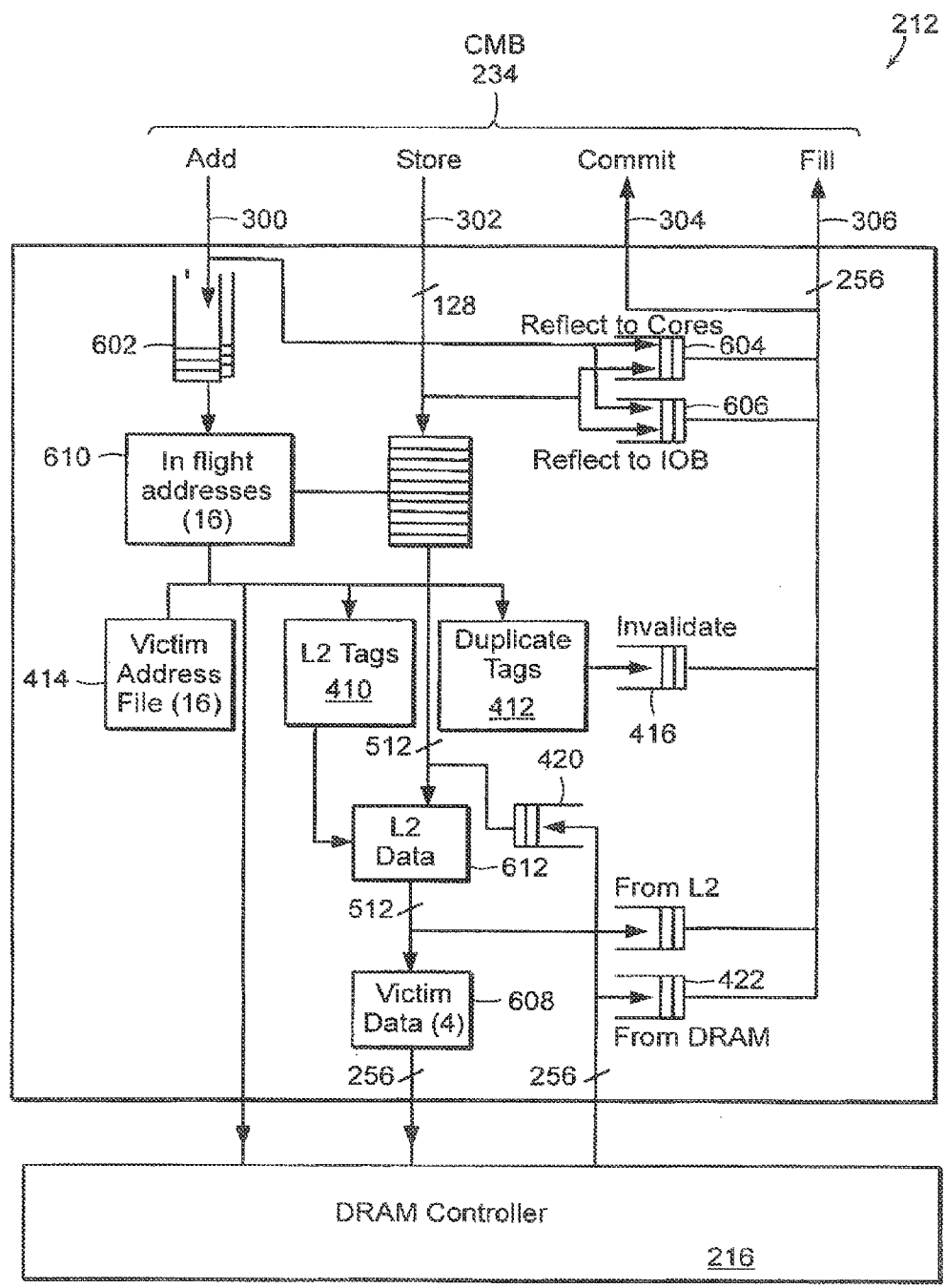
FIG. 4 is a block diagram of the cache controller and L2 cache shown in FIG. 3.

FIG. 4 is a block diagram of the Level 2 cache controller and L2 cache 212 shown in FIG. 3. The Level 2 cache controller and L2 cache 212 includes an interface to the CMB 234 and an interface to the DRAM controller 216. In one embodiment, the CMB interface is 384 bits wide, the DRAM interface is 512 bits wide, and the internal cache data interfaces are 512 bits wide. The L2 cache in the L2 cache and controller 212 is shared by all of the cores 202 and the I/O units, although it can be bypassed using particular transactions on the CMB 234.

The L2 cache controller 212 also contains internal buffering and manages simultaneous in-flight transactions. The L2 cache controller 212 maintains copies of tags for L1 data cache 204 in each core 202 and initiates invalidations to the L1 data cache 204 in the cores 202 when other CMB sources update blocks in the L1 data cache.

In one embodiment, the L2 cache is 1 MB, 8-way set associative with a 128 byte cache block. In a set associative cache, a cache block read from memory can be stored in a restricted set of blocks in the cache. A cache block is first mapped to a set of blocks and can be stored in any block in the set. For example, in an 8-way set associative cache, there are 32 blocks in a set of blocks and a 128 byte block in memory can replicated in any block in the set of blocks in the cache. The cache controller includes an address tag for each block that stores the block address. The address tag is stored in the L2 tags 410.

The CMB 234 includes write-invalidate coherence support. The data cache 204 in each core is a write-through cache. The L2 cache is write-back and both the data stored in the L2 cache 612 and the tags stored in L2 tags 410 are protected by a Single Error Correction, Double Error Detection Error Correction Code (SECDED ECC).

The L2 cache controller 212 maintains memory reference coherence and returns the latest copy of a block for every fill request, whether the latest copy of the block is in the cache (L1 data cache 204 or L2 data cache 612), in DRAM 108 (FIG. 1) or in flight. The L2 cache controller 212 also stores a duplicate copy of the tags in duplicate tags 412 for each core's L1 data cache 204. The L2 cache controller 212 compares the addresses of cache block store requests against the data cache tags stored in the duplicate tags 412, and invalidates (both copies) a data cache tag for a core 202 whenever the store is from another core 202 or coupled to the IO bus 262 (FIG. 2) from an IO unit via the IOB 232.

The L2 cache controller 212 has two memory input queues 602 that receive memory transactions from the ADD bus 300: one for transactions initiated by cores 202 and one for transactions initiated by the IOB 232.

The two queues 602 allow the L2 cache controller 212 to give the IOB memory transactions a higher priority than core transactions. The L2 cache controller 212 processes transactions from the queues 602 in one of two programmable arbitration modes, fixed priority or round-robin allowing IOB transactions required to service real-time packet transfers to be processed at a higher priority.

The L2 cache controller 212 also services CMB reflections, that is, non-memory transactions that are necessary to transfer commands and/or data between the cores and the I0B. The L2 cache controller 212 includes two reflection queues 604, 606, that store the ADD/STORE bus information to be reflected. Two different reflection queues are provided to avoid deadlock: reflection queue 604 stores reflections destined to the cores 202, and reflection queue 606 stores reflections destined to the IOB 232 over the FILL bus and COMMIT bus.

The L2 cache controller 212 can store and process up to 16 simultaneous memory transactions in its in-flight address buffer 610. The L2 cache controller 212 can also manage up to 16 in-flight cache victims, and up to four of these victims may reside in the victim data file 608. On a fill transaction, received data is returned from either the L2 cache or DRAM 108 (FIG. 1). The L2 cache controller 212 deposits data received on the STORE bus 302 into a file associated with the in-flight addresses 610. Stores can either update the cache 612 or be written-through to DRAM 108 (FIG. 1). Stores that write into the L2 data cache 612 do not require a DRAM fill to first read the old data in the block, if the store transaction writes the entire cache block.

All data movement transactions between the L2 cache controller 212 and the DRAM controller 216 are 128 byte, full-cache blocks. The L2 cache controller 212 buffers DRAM controller fills in one or both of two queues: in a DRAM-to-L2 queue 420 for data destined to be written to L2 cache 612, and in a DRAM-to-CMB queue 422 for data destined for the FILL bus 306. The L2 cache controller 212 buffers stores for the DRAM controller in the victim address/data files 414, 608 until the DRAM controller 216 accepts them.

The cache controller buffers all the COMMIT/FILL bus commands needed from each possible source: the two reflection queues 604, 606, fills from L2/DRAM 420, 422, and invalidates 416.

Figure 5:
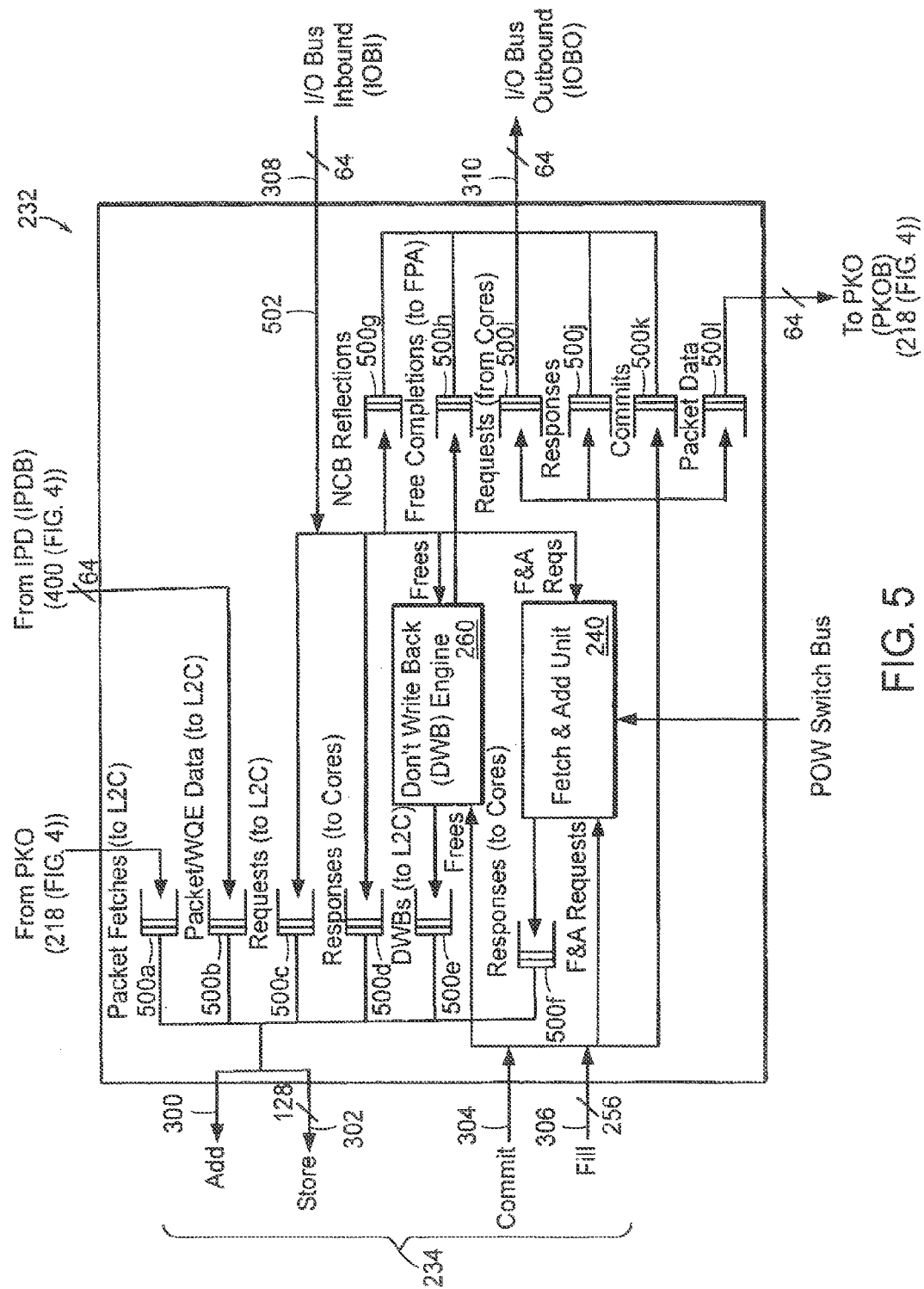
FIG. 5 is a block diagram of the I/O Bridge (IOB) in the network services processor shown in FIG. 3.

FIG. 5 is a block diagram of the I/O Bridge (IOB) 232 shown in FIG. 3. The I/O Bridge (IOB) 232 manages the overall protocol and arbitration and provides coherent I/O partitioning. The IOB 232 has three virtual busses (1) I/O to I/O (request and response) (2) core to I/O (request) and (3) I/O to L2 Cache (request and response). The IOB also has separate PKO and IPD interfaces.

The IOB 232 includes twelve queues 500a-l to store information to be transferred on different buses. There are six queues 500a-f arbitrating to transfer on the ADD/STORE buses of the Coherent Memory Bus (CMB) 234 and five queues 500g-k arbitrating to transfer on the IOBO bus. Another queue 500l queues packet data to be transferred to the PKO 218 (FIG. 3).

As previously discussed, when a buffer in memory is added to a free pool in the FPA unit 236, that buffer may also be replicated in a cache block in cache (L1 data cache 204 in a core 202 or L2 cache 612). Furthermore, these cached blocks may store a more current version of the data than stored in the corresponding block in DRAM 108 (FIG. 1). That is, the cache blocks in cache may be "dirty", signified by a dirty bit set in a tag associated with each cache block stored in L2 tags 410 (FIG. 4). As is well-known in the art, a "dirty" bit is a bit used to mark modified data stored in a cache so that the modification may be carried over to primary memory (DRAM 108 (FIG. 1)).

In a write-back cache, when dirty blocks are replaced in the cache, the dirty cache blocks are written back to DRAM to ensure that the data in the block stored in the DRAM is up-to-date. The memory has just been freed and it will not be used until it is re-allocated for processing another packet, so it would be wasteful to write the cache blocks from the level 2 cache back to the DRAM. It is more efficient to clear the dirty bit for any of these blocks that are replicated in the cache to avoid writing the 'dirty' cache blocks to DRAM later.

The core freeing the memory executes a store instruction to add the address to pool of free buffers. The store instruction from the core is reflected through reflection queue 606 on FILL bus 306 of the CMB. The IOB 232 can create Don't write back (DWB) CMB commands as a result of the memory free command.

The DWB command results in a Don't Write Back (DWB) coherent memory bus transaction on the ADD bus 300 that results in clearing the dirty bit in the L2 tags 410, if the cache block is present in the L2 cache. This is an ADD-bus only transaction on the coherent memory bus. This architecture allows the DWB engine 260 to be separated from the free pool unit 236. In one embodiment, the DWB engine 260 resides nearer to the cache controller, so less bandwidth is required to issue the DWB commands on the coherent memory bus 234. The Don't write back operation is used to avoid unnecessary writebacks from the L2 cache to DRAM for free memory locations (that is, memory blocks (buffers) in a free memory pool available for allocation).

When a core 202 or I/O unit coupled to the IO bus 262 adds free memory to a pool in the FPA unit 236, it not only specifies the address of the free memory, but also specifies the number of cache blocks for which the DWB engine 260 can send DWB commands to the L2 cache controller. The core or I/O module need not initiate any DWB commands. Rather, the DWB engine 260 automatically creates the DWB commands when it observes the command to add free memory to a pool in the FPA unit 236.

The DWB engine 260 avoids unnecessary cache memory updates when buffers replicated in cache blocks in cache that store processed packets are freed by intercepting memory free requests destined for the free pool allocator (FPA) 236. The IOB 232 intercepts memory free commands arriving from either the cores (via a reflection onto the COMMIT/FILL busses 304, 306) or from other IO units (via the IOBI bus 308). When the DWB engine 260 observes a memory free operation, it intercepts and queues the memory free operation. The free memory is not made available to the FPA unit 236 while the DWB engine 260 is sending DWB commands for the free memory. Later the DWB engine 260 sends all necessary DWB commands for the free memory. After all of the DWB commands are completed/visible, the memory free operation continues by forwarding the request to the FPA unit 236.

The IOB 232 can buffer a limited number of the memory free commands inside the DWB 260. If buffering is available, the IOB intercepts the memory free request until the IOB 232 has finished issuing the CMB DWB commands through the DWB engine 260 to the L2 cache controller queue 500e for the request, and then forwards the request onto the FPA unit 236 (via the IOBO bus 310). It is optional for the IOB 232 to issue the DWB requests. Thus, if buffering is not available in the DWB 232, the DWB engine 260 does not intercept the memory free request, and instead the memory free request is forwarded directly to the FPA unit 236 and no DWB commands are issued.

The memory free requests include a hint indicating the number of DWB Coherent Memory Bus (CMB) transactions that the IOB 232 can issue. Don't Write Back (DWB) commands are issued on the ADD bus 300 in the Coherent Memory Bus (CMB) 234 for free memory blocks so that DRAM bandwidth is not unnecessarily wasted writing the freed cache blocks back to DRAM. The DWB commands are queued on the DWB-to-L2C queue 500e and result in the L2 cache controller 212 clearing the dirty bits for the selected blocks in the L2 tags 410 in the L2 cache memory controller, thus avoiding these wasteful write-backs to DRAM 108 (FIG. 1).

Returning to FIG. 4, the DWB command enters the "in flight address" structure 610. Eventually, it is selected to be sent to the L2 tags 410. The address in the DWB command is compared to the addresses stored in the L2 tags 410, and the dirty bit the L2 tag is cleared if the associated address is replicated in cache (that is, there is a 'hit'), the dirty bit is cleared. If the associated address hits in a write-buffer entry in a write buffer in a core 202 (that is, the data has not yet been updated in L2 cache), the write-buffer entry is invalidated. This way, all memory updates for the cache block are voided.

No further processing of the address is performed, that is the address is not checked against copies of the L1 tags in the "Duplicate Tags" block 412, and the victim address file 414 as would be the case for other in flight addresses.

Returning to FIG. 5, the DWB engine 260 in the input/output bridge 232 waits to receive a commit from the L2 cache controller before it can pass the free request onto the FPA unit 236. The IOB bridges the address/data pair into the IOBO bus, the FPA unit 236 recognizes it, and buffers the pointer to the available memory in the pool within the FPA unit 236 block. A DMA write access can be used to free up space in the pool within the FPA unit 236. The FPA unit 236 places the Direct Memory Access (DMA) address and data onto the IOBI bus (shown), which the IOB bridges onto the CMB 234.

Figure 6:
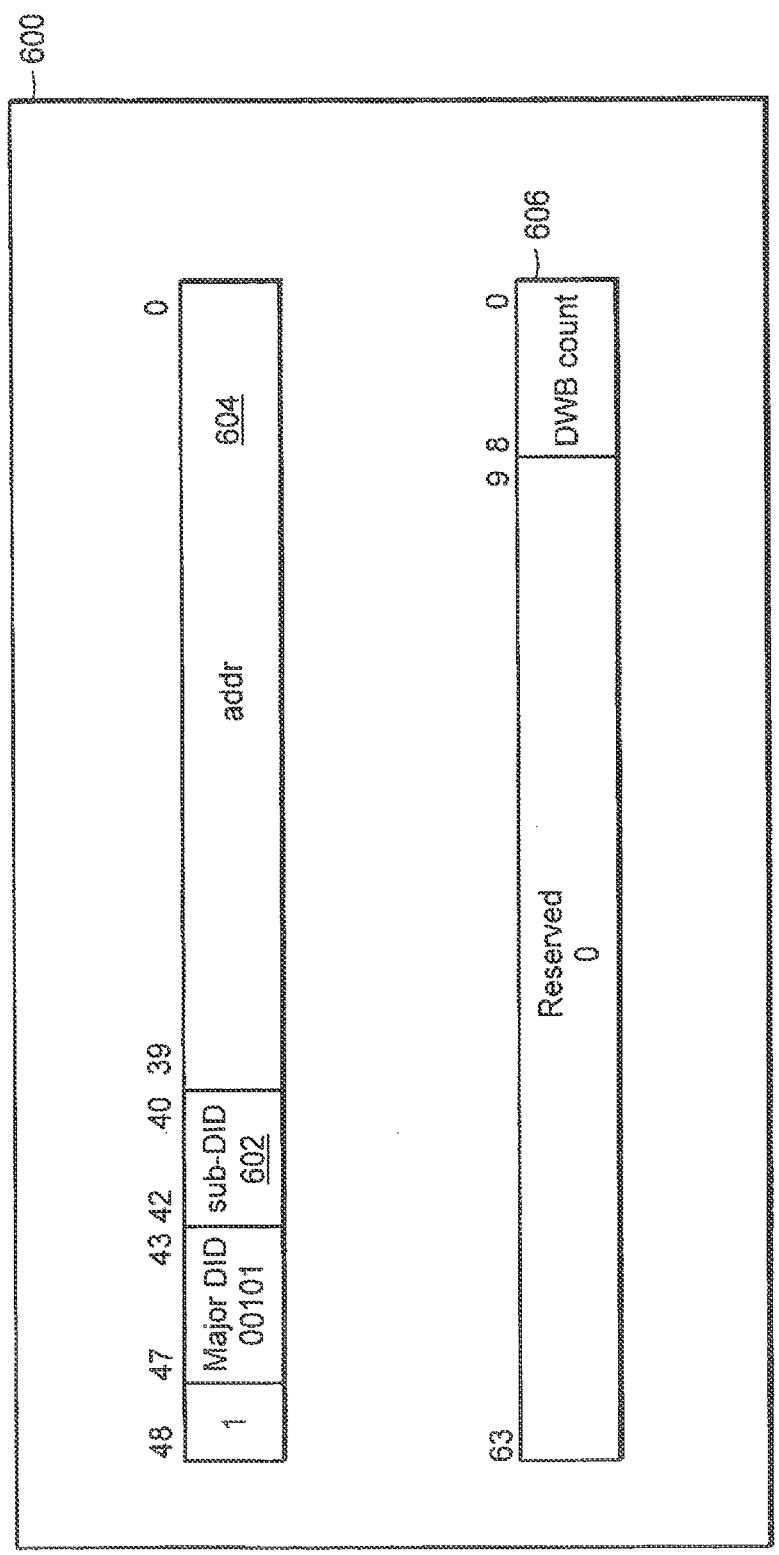
FIG. 6 illustrates the format of a pool free command to add a free address to a pool.

FIG. 6 illustrates the format of a pool free command 600 to add a free address to a pool in the FPA unit 236. The pool free command 600 includes a subdid field 602 that stores the pool number in the FPA unit 236 to which the address is to be added, a pointer field 604 for storing a pointer to the free (available) memory, and a DWB count field 606 for storing a DWB count. The DWB count specifies the number of cache lines starting at the address stored in the pointer field 604 for which the IOB is to execute "don't write back" commands. A pool free command specifies the maximum number of DWBs to execute on the coherent memory bus 234.

The DWB engine 260 in the IOB 232 starts issuing DWB commands for cache blocks starting at the beginning of the free memory identified by the pointer 604 and marches forward linearly. As the DWB commands consume bandwidth on the CMB, the DWB count should be selected so that DWB commands are only issued for cache blocks that may have been modified.

While this invention has been particularly shown and described with references to preferred embodiments thereof, it will be understood by those skilled in the art that various changes in form and details may be made therein without departing from the scope of the invention encompassed by the appended claims.

What is claimed is:

1. A network services processor comprising:
   a plurality of processors;
   a coherent shared memory including a cache and a memory, the coherent shared memory shared by the plurality of processors;
   a free pool allocator configured to maintain pools of pointers to free memory locations;
   an input/output bridge coupled to the plurality of processors and the cache, the input/output bridge intercepting memory free commands issued by one or more of the processors and destined for the free pool allocator, each memory free command requesting to free one or more portions in the memory, and based on intercepting a memory free command to request to free a selected memory portion, issuing a don't write back command to a cache controller, and forwarding the memory free command to the free pool allocator based on completion of the don't write back command; and
   the cache controller coupled to the plurality of processors, the cache and the input/output bridge, the cache controller configured to receive the don't write back command from the input/output bridge and to compare an address of the selected memory portion to addresses stored in the cache and, in an event the address of the selected memory portion is replicated in the cache, void a memory update to the selected memory portion by clearing a dirty bit associated with a corresponding modified cache block.

2. The network services processor of claim 1 wherein the input/output bridge further comprises:
   a don't write back queue which stores don't write back commands to be issued to the cache controller.

3. The network services processor of claim 2 wherein the input/output bridge further comprises:
   a free queue that stores memory free commands to free blocks to be added to a free pool.

4. The network services processor of claim 3 further comprising:
   a plurality of processing units coupled to the input/output bridge, the input/output bridge storing packets to be transferred between processing units and the coherent shared memory in which packets are stored for processing by the processors.

5. The network services processor of claim 1, wherein:
   the free pool allocator further provides free lists of buffers in memory for storing received packets.

6. The network services processor of claim 1, wherein the coherent shared memory is coupled to the processors and input/output bridge by a coherent memory bus that includes a commit bus, a store bus, a fill bus and an add bus.

7. A method comprising:
   sharing a coherent shared memory among a plurality of processors, the coherent shared memory including a cache and a memory; and
   intercepting, at an input/output bridge, memory free commands issued by one or more of the processors and destined for a free pool allocator configured to maintain pools of pointers to free memory locations, each memory free command requesting to free one or more portions in the memory and based on intercepting a memory free command to request to free a selected memory portion, issuing a don't write back command to a cache controller and forwarding the memory free command to the free pool allocator based on completion of the don't write back command; and
   receiving, at a cache controller, the don't write back command from the input/output bridge and comparing an address of the selected memory portion to addresses stored in the cache and, in an event the address of the selected memory portion is replicated in the cache, voiding a memory update to the selected memory portion by clearing a dirty bit associated with a corresponding modified cache block.

8. The method of claim 7 further comprising:
   storing don't write back commands to be issued to the cache controller in a don't write back queue.

9. The method of claim 7 further comprising:
   storing memory free commands to free blocks to be added to a free pool in a free queue.

10. The method of claim 7 further comprising:
    storing packets to be transferred between a plurality of processing units and the coherent shared memory in which packets are stored for processing by the processors.

11. The method of claim 7, further comprising:
    providing a list of free buffers in memory for storing received packets.

12. The method of claim 7, wherein the coherent shared memory is coupled to the processors and input/output bridge by a coherent memory bus that includes a commit bus, a store bus, a fill bus and an add bus.

* * * * *